(12) United States Patent
Makisumi

(10) Patent No.: US 12,018,741 B2
(45) Date of Patent: Jun. 25, 2024

(54) GEAR MECHANISM AND ROBOT

(71) Applicant: Nabtesco Corporation, Tokyo (JP)

(72) Inventor: Kazuyoshi Makisumi, Tokyo (JP)

(73) Assignee: Nabtesco Corporation, Tokyo (JP)

( * ) Notice: Subject to any disclaimer, the term of this patent is extended or adjusted under 35 U.S.C. 154(b) by 0 days.

(21) Appl. No.: 17/990,500

(22) Filed: Nov. 18, 2022

(65) Prior Publication Data

US 2023/0167890 A1 Jun. 1, 2023

(30) Foreign Application Priority Data

Nov. 26, 2021 (JP) ................................. 2021-192162

(51) Int. Cl.
| | |
|---|---|
| *F16H 55/06* | (2006.01) |
| *B25J 9/10* | (2006.01) |
| *F16H 57/04* | (2010.01) |

(52) U.S. Cl.
CPC .............. *F16H 55/06* (2013.01); *B25J 9/102* (2013.01); *F16H 57/0413* (2013.01)

(58) Field of Classification Search
CPC ........ F16H 55/06; F16H 57/0413; B25J 9/102
See application file for complete search history.

(56) References Cited

U.S. PATENT DOCUMENTS

| | | | |
|---|---|---|---|
| 3,715,932 A * | 2/1973 | Sharp .................. | F16H 57/0412 165/47 |
| 2017/0045118 A1 | 2/2017 | Hvass et al. | |
| 2019/0390735 A1 | 12/2019 | Tamura et al. | |
| 2020/0025277 A1* | 1/2020 | Tamura ..................... | F16H 1/32 |
| 2023/0302666 A1* | 9/2023 | Makisumi .............. | B25J 9/0012 |

FOREIGN PATENT DOCUMENTS

| | | |
|---|---|---|
| DE | 102019114097 A1 | 12/2019 |
| JP | 2020-016262 A | 1/2020 |

OTHER PUBLICATIONS

Extended European Search Report dated Apr. 4, 2023, issued in corresponding European Patent Application No. 22208307.3 (9 pgs.).

* cited by examiner

*Primary Examiner* — Terence Boes
(74) *Attorney, Agent, or Firm* — Pillsbury Winthrop Shaw Pittman, LLP

(57) ABSTRACT

A speed reducing mechanism according to one embodiment of the disclosure includes a case, internal tooth pins, an oscillating gear meshing with the internal tooth pins, an input crankshaft transmitting a rotational force to the oscillating gear, and an output shaft to which a rotational force of the oscillating gear is transmitted. One of the shafts at least partially has a shaft-side high thermal conductivity portion that extends over the entire axial length of the shaft and has a thermal conductivity higher than the thermal conductivity of the oscillating gear.

14 Claims, 3 Drawing Sheets

GEAR MECHANISM AND ROBOT

CROSS-REFERENCE TO RELATED APPLICATIONS

The present application is based on and claims the benefit of priority from Japanese Patent Application Serial No. 2021-192162 (filed on Nov. 26, 2021), the contents of which are hereby incorporated by reference in their entirety.

TECHNICAL FIELD

The present disclosure relates to a gear mechanism and a robot.

BACKGROUND

As one type of robot, a cooperative robot that shares a work space with workers have been known. For example, a multi-joint cooperative robot, which is one of such cooperative robots, is provided with a speed reducing mechanism in a form of a gear mechanism at a joint where two arms of the robot are connected to each other. In addition, an electric motor or the like is provided for supplying a rotational force to the speed reducing mechanism. By decelerating and outputting the rotational force of the electric motor, one of the two arms is given a larger output torque relative to the other of the two arms.

As the speed reducing mechanism, for example, an eccentric oscillating-type speed reducing mechanism with high rotational position accuracy and high load resistance is used. This type of speed reducing mechanism includes, for example, an internal gear, an oscillating gear (external gear) that meshes with the internal gear, and a crankshaft (eccentric member) that oscillatory rotates the oscillating gear. However, for this type of speed reducing mechanism, the temperature inside the speed reducing mechanism rises due to frictional heat generated between the internal gear and the oscillating gear whose meshing position sequentially changes. If the temperature inside the speed reducing mechanism becomes too high, seizure or the like will occur, which shortens the life of the product. To address this, various techniques have been proposed to suppress the temperature rise in the speed reducing mechanism.

For example, using an oscillating gear made of resin has been disclosed. The internal gear is configured to include a resin case (internal gear body) and internal tooth pins (external pins) that are disposed rotatably along pin grooves formed in the case and that are formed of a material with a higher thermal conductivity than that of the case. In this configuration, the heat generated by the meshing between the internal gear and the oscillating gear is transmitted to the internal tooth pins, thereby suppressing the temperature rise of the case and the oscillating gear (for example, see Japanese Patent Application Publication No. 2020-16262).

In the internal gear of such a gear mechanism, the volume of the internal tooth pins is very small compared to the volume of the case. Thus, the amount of heat that can be stored in the internal tooth pins is limited, so the suppression of the temperature rise in the gear mechanism actually depends on heat dissipation of the case. This leads to a drawback that the heat is trapped inside the gear mechanism due to insufficient heat dissipation and it is difficult to efficiently suppress the temperature rise inside the gear mechanism.

SUMMARY

The present disclosure provides a gear mechanism and a robot in which the internal temperature rise is efficiently suppressed.

A gear mechanism according to one aspect of the disclosure includes: a first gear; a second gear meshing with the first gear; and a shaft inserted in the second gear. The shaft transmits a rotational force to the second gear or a rotational force of the second gear is transmitted to the shaft. The shaft at least partially has a shaft-side high thermal conductivity portion, and the shaft-side high thermal conductivity portion extends over the entire axial length of the shaft, the thermal conductivity of the shaft-side high thermal conductivity portion is higher than the thermal conductivity of the second gear.

With this configuration, the heat generated by engagement between the first gear and the second gear and the heat generated between the second gear and the shaft can be actively transferred to the shaft. At least a part of the shaft is provided with the shaft-side high thermal conductivity portion extending over the entire axial length of the shaft. Thus, the heat transferred to the shaft spreads to each end portion of the shaft in the axial direction. Heat can be actively released from the end portions of the shaft in the axial direction. Therefore, it is possible to efficiently suppress the temperature rise inside the gear mechanism.

In the above configuration, the shaft may have a tubular portion extending over the entire axial length of the shaft. The shaft-side high thermal conductivity portion may be provided inside the tubular portion and contacts an inner peripheral surface of the tubular portion, and the rigidity of the tubular portion may be higher than the rigidity of the shaft-side high thermal conductivity portion.

In the above configuration, the thermal conductivity of the shaft-side high thermal conductivity portion may be higher than the thermal conductivity of the tubular portion and is 100 W/m·K or greater.

In the above configuration, the shaft-side high thermal conductivity portion may include a heat pipe.

In the above configuration, a support member rotatably supporting each axial end portion of the shaft may be further provided. The support member may have a support member-side high thermal conductivity portion provided around the shaft, and the thermal conductivity of the support member-side high thermal conductivity portion may be higher than the thermal conductivity of the second gear and the thermal conductivity of the support member.

In the above configuration, the support member may have a concave portion formed around the output shaft, and the support member-side high thermal conductivity portion may be received in the concave portion.

In the above configuration, the support member-side high thermal conductivity portion may include grease.

In the above configuration, the thermal conductivity of the support member-side high thermal conductivity portion may be 5 W/m·K or greater.

In the above configuration, a mating member to which the support member is attached may be further provided. The thermal conductivity of the mating member may be equal to or higher than the thermal conductivity of the shaft-side high thermal conductivity portion.

In the above configuration, the first gear may include an internal gear that has internal teeth, and the second gear may include an oscillating gear that has external teeth meshing with the internal teeth and is oscillatory rotated. The shaft may include at least one of an input crankshaft or an output shaft, the input crankshaft transmitting a rotational force to the oscillating gear, a rotational force of the oscillating gear being transmitted to the output shaft. The input crankshaft may have an eccentric portion that rotatably supports the oscillating gear, and the output shaft may be provided around the input crankshaft and inserted in the oscillating gear.

In the above configuration, the internal gear may include a cylindrical case, and a plurality of internal tooth pins arranged on an inner peripheral surface of the case along a circumferential direction. The thermal conductivity of the case may be higher than the thermal conductivity of the plurality of internal tooth pins and the thermal conductivity of the oscillating gear.

In the above configuration, the internal gear may include a cylindrical case; and a plurality of internal tooth pins arranged on an inner peripheral surface of the case along a circumferential direction. The thermal conductivity of the case may be higher than a thermal conductivity of the oscillating gear, and the thermal conductivity of the plurality of internal tooth pins may be higher than the thermal conductivity of the oscillating gear.

In the above configuration, the oscillating gear may be made of resin.

A gear mechanism according to another aspect of the disclosure includes: an internal gear having internal teeth; an oscillating gear being oscillatory rotated; an input crankshaft transmitting a rotational force to the oscillating gear; an output shaft to which a rotational force of the oscillating gear is transmitted; and a support member supporting each axial end portion of the output shaft rotatably. The oscillating gear has external teeth that mesh with the internal teeth of the internal gear. The input crankshaft has an eccentric portion that rotatably supports the oscillating gear. The output shaft is provided around the input crankshaft and inserted in the oscillating gear. At least one of the input crankshaft or the output shaft includes a tubular portion extending over an entire axial length of shaft, and a shaft-side high thermal conductivity portion provided inside the tubular portion. The shaft-side high thermal conductivity portion contacts an inner peripheral surface of the tubular portion. The thermal conductivity of the shaft-side high thermal conductivity portion is higher than the thermal conductivity of the oscillating gear. The rigidity of the tubular portion is higher than the rigidity of the shaft-side high thermal conductivity portion. The support member has a concave portion formed around the output shaft, and the concave portion receives a support member-side high thermal conductivity portion that has a thermal conductivity higher than the thermal conductivity of the oscillating gear.

In this eccentric oscillating gear mechanism, the heat generated by engagement between the internal gear and the oscillating gear and the heat generated between the oscillating gear and the shaft are actively transferred to the input crankshaft or the output shaft. At least a part of the shaft is provided with the shaft-side high thermal conductivity portion extending over the entire axial length of the shaft. Thus, the heat transferred to the input crankshaft or the output shaft spreads to each end portion of the shaft in the axial direction. Heat can be actively released from the end portions of one of the shafts in the axial direction. Therefore, it is possible to efficiently suppress the temperature rise inside the gear mechanism. Since at least one of the input crankshaft or the output shaft has the tubular portion and the shaft-side high thermal conductivity portion, the rigidity of the shaft can be ensured even when the shaft-side high thermal conductivity portion having a high thermal conductivity is used for one of the shafts. As a result, a highly reliable gear mechanism can be provided.

A gear mechanism according to yet another aspect of the disclosure includes: a cylindrical case; and a plurality of internal tooth pins arranged on an inner peripheral surface of the case along a circumferential direction; an oscillating gear being oscillatory rotated; an input crankshaft transmitting a rotational force to the oscillating gear; an output shaft to which a rotational force of the oscillating gear is transmitted; and a support member rotatably supporting each axial end portion of the output shaft. The oscillating gear has external teeth that mesh with the plurality of internal tooth pins. The input crankshaft has an eccentric portion that rotatably supports the oscillating gear, and the output shaft is provided around the input crankshaft and inserted in the oscillating gear. The thermal conductivity of the case is higher than the thermal conductivity of the plurality of internal tooth pins and the thermal conductivity of the oscillating gear.

In this eccentric oscillating gear mechanism, the heat generated by engagement between the internal gear and the oscillating gear and the heat generated between the oscillating gear and the shaft are actively transferred to the case. Since the heat is effectively released via the case, it is possible to efficiently suppress the temperature rise inside the gear mechanism.

A robot according to one aspect of the disclosure includes: a first member and a second member; and a gear mechanism provided between the first member and the second member. wherein the gear mechanism rotates the second member relative to the first member, wherein the gear mechanism includes: an internal gear having internal teeth; an oscillating gear being oscillatory rotated; an input crankshaft transmitting a rotational force to the oscillating gear; an output shaft to which a rotational force of the oscillating gear is transmitted; and a support member fixed to the second member. The internal gear is fixed to the first member. The oscillating gear has external teeth that mesh with the internal teeth of the internal gear. The input crankshaft has an eccentric portion that rotatably supports the oscillating gear. The output shaft is provided around the input crankshaft and inserted in the oscillating gear. The support member rotatably supports each axial end portion of the output shaft. One of the input crankshaft or the output shaft has a shaft-side high thermal conductivity portion, the shaft-side high thermal conductivity portion having a thermal conductivity higher than a thermal conductivity of the oscillating gear. The shaft-side high thermal conductivity portion is provided at least partially in the one of the input crankshaft or the output shaft, and the shaft-side high thermal conductivity portion extends over an entire axial length of the one of the input crankshaft or the output shaft.

With this configuration, the robot using the eccentric oscillating type gear mechanism can efficiently suppress the temperature rise inside the gear mechanism. As a result, the product life of the gear mechanism can be extended, and the maintenance cost of the robot can be reduced.

In the above configuration, at least one of the input crankshaft or the output shaft may include a tubular portion extending over an entire axial length of shaft, and a shaft-side high thermal conductivity portion provided inside the tubular portion. The shaft-side high thermal conductivity portion may contact an inner peripheral surface of the tubular portion.

In the above configuration, the support member may have a concave portion formed around the output shaft, and a support member-side high thermal conductivity portion may be received in the concave portion. The thermal conductivity of the support member-side high thermal conductivity portion may be higher than the thermal conductivity of the oscillating gear.

In the above configuration, the thermal conductivity of the second member may be equal to or higher than the thermal conductivity of the output shaft.

In the above configuration, the first gear may include an internal gear that has internal teeth, and the second gear may include an oscillating gear that has external teeth meshing with the internal teeth and is oscillatory rotated. The shaft may include at least one of an input crankshaft or an output shaft, the input crankshaft transmitting a rotational force to the oscillating gear, a rotational force of the oscillating gear being transmitted to the output shaft. The input crankshaft may have an eccentric portion that rotatably supports the oscillating gear. The output shaft may be provided around the input crankshaft and inserted in the oscillating gear.

In the above gear mechanism and robot, it is possible to efficiently suppress the temperature rise thereinside.

DESCRIPTION OF THE EMBODIMENTS

The following describes embodiments of the present disclosure with reference to the drawings.

<Cooperative Robot>

Figure 1:
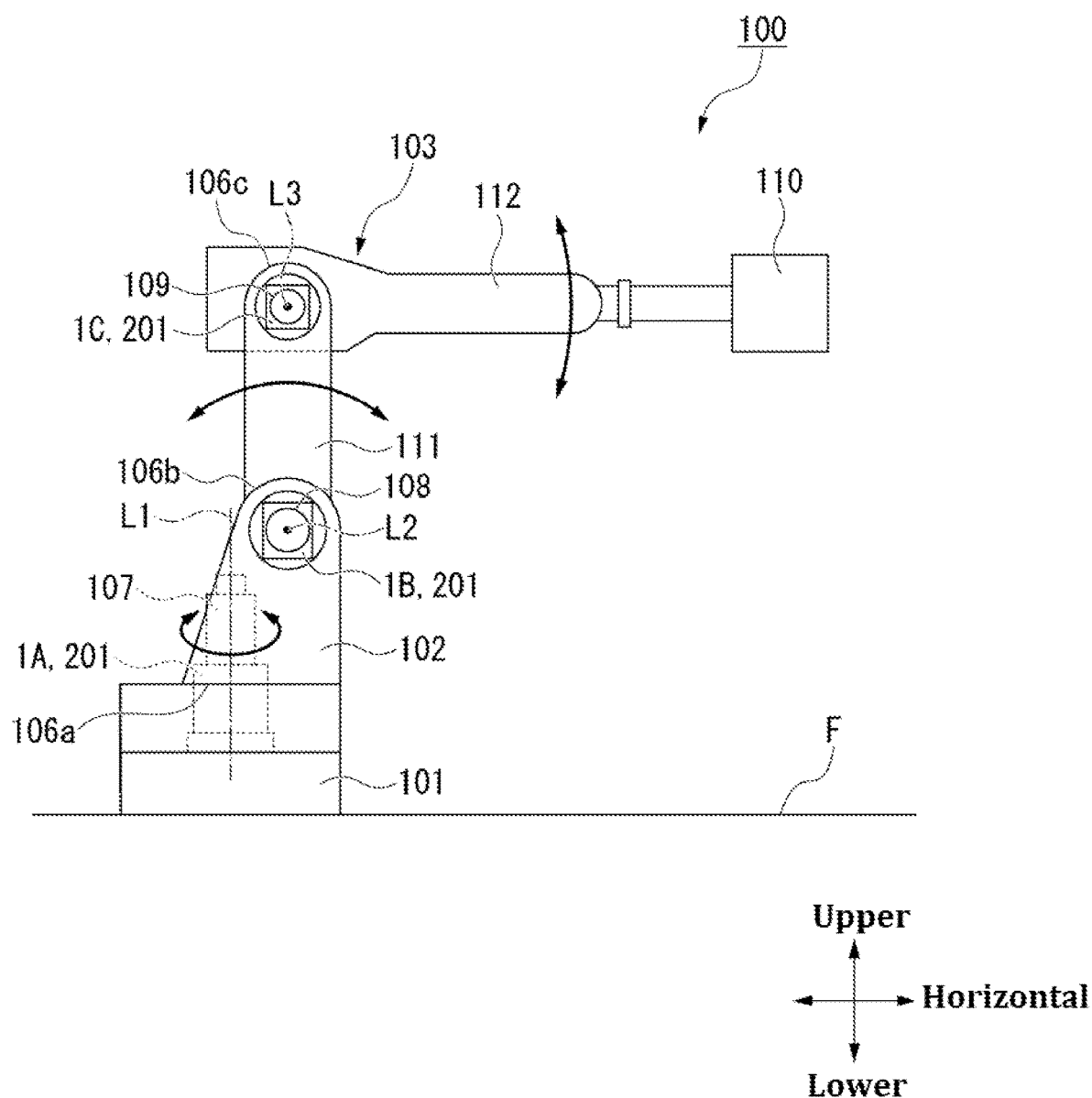
FIG. 1 schematically illustrates a configuration of a cooperative robot according to an embodiment of the disclosure.

FIG. 1 schematically shows the configuration of a cooperative robot 100. In the following description, the vertical and horizontal directions of the cooperative robot 100 are defined as the vertical and horizontal directions when the cooperative robot 100 is placed on an installation surface F.

As shown in FIG. 1, the cooperative robot 100 includes a base portion 101 (an example of a first member or a second member in the claims) placed on the installation surface F, a rotating head 102 (an example of the first member or the second member in the claims), and an arm unit 103 (an example of the first member or the second member) rotatably coupled to an upper portion of the rotary head 102 (the example of the first member or the second member in the claims) (each of these members is also an example of a mating member in the claims). The cooperative robot 100 further includes: speed reducing mechanisms 1A, 1B, and 1C (a first speed reducing mechanism 1A, second speed reducing mechanism 1B, and third speed reducing mechanism 1C) coupled to joint portions 106a, 106b, and 106c (first joint portion 106a, second joint portion 106b, and third joint portion 106c) of the base portion 101, the rotating head 102, and the arm unit 103, respectively; servomotors 107, 108, 109 (first servomotor 107, second servomotor 108, third servomotor 109) as drive sources; and an end effector 110 attached to the arm unit 103.

The rotating head 102 is coupled to the base portion 101 such that it is rotatable around a first rotation axis L1. This coupling portion is the first joint portion 106a, and the first speed reducing mechanism 1A and the first servomotor 107 are coupled to the first joint portion 106a. The first rotation axis L1 coincides with, for example, the vertical direction. Rotation of the first servomotor 107 is transmitted to the rotating head 102 via the first speed reducing mechanism 1. In this way, the rotating head 102 is rotationally driven relative to the base portion 101 around the first rotation axis L1.

The arm unit 103 includes, for example, two arms 111 and 112 (first arm 111 and second arm 112) that extend in one direction. One end of the first arm 111 of the two arms 111 and 112 is coupled to the upper portion of the rotating head 102 such that it is rotatable about a second rotation axis L2. This coupling portion is the second joint portion 106b, and the second speed reducing mechanism 1B and the second servomotor 108 are coupled to the second joint portion 106b.

The second rotation axis L2 coincides with, for example, the horizontal direction. Rotation of the second servomotor 108 is transmitted to the first arm 111 via the second speed reducing mechanism 2. In this way, the first arm 111 is rotationally driven relative to the rotating head 102 around the second rotation axis L2. For example, the first arm 111 is driven to move swingably in the front and rear directions relative to the base portion 101.

One end of the second arm 112 of the two arms 111 and 112 is coupled to the other end of the first arm 111 such that it is rotatable around a third rotation axis L3. This coupling portion is the third joint portion 106c, and the third speed reducing mechanism 1C and the third servomotor 109 are coupled to the third joint portion 106c. The third rotation axis L3 coincides with, for example, the horizontal direction. Rotation of the third servomotor 109 is transmitted to the second arm 112 via the third speed reducing mechanism 1C. In this way, the second arm 112 is rotationally driven relative to the first arm 111 about the third rotation axis L3. For example, the second arm 112 is driven to move swingable in the upper and lower directions relative to the first arm 111.

The end effector 110 is coupled to the other end of the second arm 112. By driving the rotating head 102, the first arm 111, and the second arm 112, the end effector 110 is three-dimensionally driven.

The base portion 101, the rotating head 102, the first arm 111, and the second arm 112 of the cooperative robot 100 are made of, for example, an aluminum alloy. The thermal conductivity of the aluminum alloy is about 201 [W/m·K]. Alternatively, they may be made of, for example, a magnesium alloy, carbon fiber reinforced plastic (CFRP), or a resin containing boron nitride to increase the thermal conductivity. The thermal conductivity of the magnesium alloy is, for example, about 51.2 [W/m·K].

First Embodiment

<Speed Reducing Mechanism>

The speed reducing mechanism 1A to 1C will be now described with reference to FIG. 2. The basic configuration of each speed reducing mechanism 1A-1C is the same. Therefore, only the second speed reducing mechanism 1B among the speed reducing mechanisms 1A to 1C will be hereunder described, and description of the first speed reducing mechanism 1A and the third speed reducing mechanism 1C will be omitted.

Figure 2:
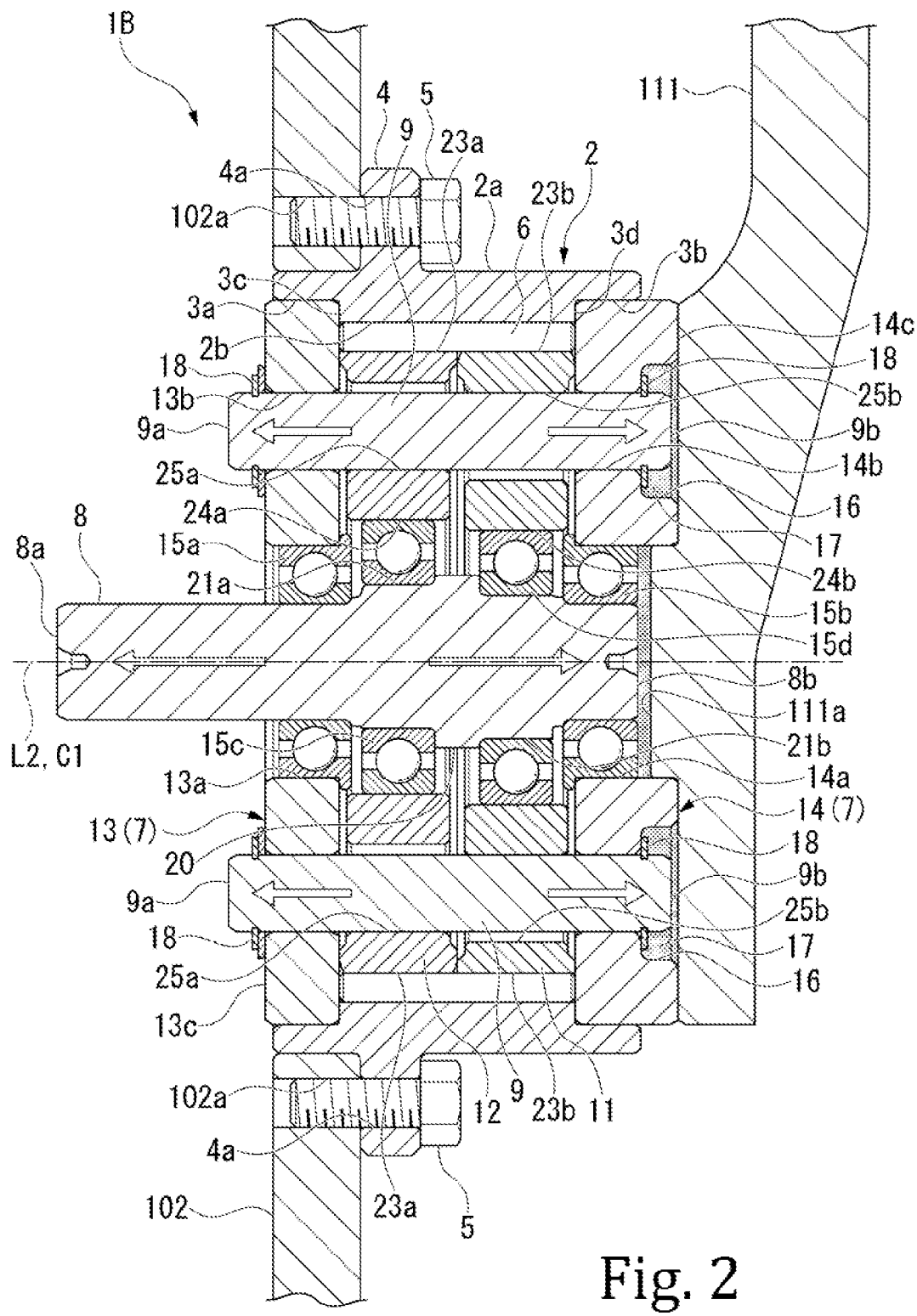
FIG. 2 schematically illustrates a configuration of a second speed reducing mechanism in a first embodiment of the disclosure.

FIG. 2 schematically shows the configuration of the second speed reducing mechanism 1B. As shown in FIG. 2, the second speed reducing mechanism 1B is a so-called eccentric oscillating-type speed reducing mechanism. The second speed reducing mechanism 1B includes a cylindrical case 2 (an example of a first gear or an internal gear in the claims), a carrier 7 (an example of a support member in the claims) rotatably supported by the case 2, an input crankshaft 8 (center shaft; an example of a shaft-side high heat-conductivity portion in the claims) rotatably supported by the carrier 7, a plurality of (for example, three) output shafts 9 (an example of a shaft-side high-heat-conductivity portion in the claims), and oscillating gears 11 and 12 (first oscillating gear 11 and second oscillating gear 12; an example of a second gear in the claims) rotatably supported by the input crankshaft 8.

A central axis C1 of the case 2 coincides with the second rotation axis L2. In the following description, the direction parallel to the second rotation axis L2 may be referred to as an axial direction, the circumferential direction of the second rotation axis L2 may be referred to as a circumferential direction, and the direction orthogonal to the axial direction and the circumferential direction may be referred to as a radial direction.

The case 2 is made of, for example, an aluminum alloy. Alternatively, the case 2 may be made of, for example, a magnesium alloy, carbon fiber reinforced plastic (CFRP), a resin containing boron nitride to increase thermal conductivity, or the like. The thermal conductivity of the case 2 is preferably higher than the thermal conductivity of the internal tooth pin 6, which will be described later. An outer flange portion 4 projecting radially outward is integrally formed on an outer peripheral surface 2a of the case 2 at a position on one side (left side in FIG. 2) rather than the center in the axial direction. The outer flange portion 4 has a rectangular section along the axial direction.

The outer flange portion 4 has a plurality of bolt holes 4a that penetrate therethrough in the axial direction and are arranged at equal intervals in the circumferential direction. For example, the rotating head 102 overlaps the outer flange portion 4 from the outside in the axial direction. A bolt 5 is inserted into each bolt hole 4a from the side opposite to the rotating head 102 of the outer flange portion 4. The case 2 is fixed to the rotating head 102 by fastening the bolt 5 into a female thread portion 102a of the rotating head 102.

On both sides in the axial direction of the inner peripheral surface 2b of the case 2, radially enlarged portions 3a and 3b (first radially enlarged portion 3a and second radially enlarged portion 3b) are formed with stepped portions 3c, 3d (first stepped portion 3c and second stepped portion 3d) interposed therebetween, respectively. The inner diameters of the radially enlarged portions 3a and 3b are larger than the inner diameter of the inner peripheral surface 2b of the case 2. The carrier 7 is provided on each of the radially enlarged portions 3a and 3b.

A plurality of internal tooth pins 6 (an example of the first gear or the internal gear in the claims) are provided on the inner peripheral surface 2b of the case 2 between the two stepped portions 3c and 3d. The internal tooth pins 6 can be made of a metal material, a high-thermal-conductivity resin, a non-metallic material, or the like. The internal tooth pins 6 may be made of a resin containing carbon nanotubes (CNT) or boron nitride nanotubes (BNNT). The internal tooth pins 6 may be made of ferrous metal such as bearing steel. The internal tooth pins 6 may be made of carbon fiber reinforced plastic (CFRP).

Each of the internal tooth pins 6 is shaped like a column. The configuration of the internal tooth pin 6 is not limited this, but it may be a hollowed member. Each of the internal tooth pins 6 may have a multi-layered structure with a core material being wrapped in a surface material. For example, one of the core and surface material of the internal tooth pin 6 may be made of an iron-based metal, and the other may be made of a copper- or aluminum-based metal. Such a structure can eliminate the trade-off between the mechanical and thermal characteristics. As yet another example of the configuration of the internal tooth pin 6, one of the core and surface material may be made of metal and the other may be made of resin. The internal tooth pins 6 may be made of sintered metal.

The axial direction of the internal tooth pins 6 coincides with the central axis C1 of the case 2. The internal tooth pins 6 are arranged at regular intervals in the circumferential direction. The internal tooth pins 6 serve as internal teeth that mesh with the oscillating gears 11 and 12.

The carrier 7 includes a first carrier (shaft flange) 13 provided in the first radially enlarged portion 3a situated closer to the rotating head 102 among the two radially enlarged portions 3a and 3b formed in the case 2, and a second carrier (hold flange) 14 provided in the second radially enlarged portion 3b situated opposite to the first radially enlarged portion 3a in the axial direction. Each of the carriers 13 and 14 is formed in a disc shape. The outer peripheral surfaces of the carriers 13 and 14 are slidably fitted to the radially enlarged portions 3a and 3b, respectively. The carriers 13 and 14 are arranged and fixed in the axial direction by abutting against the corresponding stepped portions 3c and 3d.

The carriers 13 and 14 are made of resin, for example. For example, the carriers 13 and 14 may be made of POM (polyacetal). Each of the carriers 13 and 14 may be formed of a resin different from POM, such as PAEK (Polyaryl Ether Ketones) typified by PEEK (Poly Ether Ketone). The resin may be PPS (Polyphenylene sulfide) or a resin containing PPS. The carriers 13 and 14 may be formed of carbon fiber reinforced plastic (CFRP). For example, the thermal conductivity of PPS is about 0.2 [W/m·K]. The thermal conductivity of PPS containing boron nitride is, for example, about 2.6 [W/m·K].

Input shaft holes 13a and 14a that penetrate the carriers 13 and 14, respectively, in the radial direction are formed at the radial center of the carriers 13 and 14. An input crankshaft 8 is inserted into these input shaft holes 13a and 14a. Bearings 15a and 15b (first bearing 15a and second bearing 15b) are provided in the input shaft holes 13a and 14a, respectively. Ball bearings, for example, are used as the bearings 15a and 15b. The input crankshaft 8 is rotatably supported by the carriers 13 and 14 via these bearings 15a and 15b. The rotation axis of the input crankshaft 8 coincides with the central axis C1 of the case 2 (second rotation axis L2).

A plurality of (for example, three) output shaft holes 13b and 14b are formed at equal intervals in the circumferential direction around the input shaft holes 13a and 14a in each of the carriers 13 and 14, respectively. An output shaft 9 is inserted into these output shaft holes 13b and 14b. Among the two carriers 13 and 14, a concave portion 16 is formed coaxially with the output shaft hole 14b in a surface 14c of the second carrier 14 on the side opposite to the first carrier 13. The concave portion 16 opens on the side of the surface 14c and communicates with the output shaft hole 14b.

The concave portion 16 is filled with grease 17 (an example of a support member-side high thermal conductivity portion in the claims). The grease 17 is a support member-side high thermal conductivity portion whose thermal conductivity is higher than those of the oscillating gears 11 and 12 and the second carrier 14. The thermal conductivity of the grease 17 is 5 [W/m·K] or greater. The output shaft 9 inserted in the output shaft holes 13b and 14b is made of, for example, an aluminum alloy. Thus, the output shaft 9 itself is formed of a shaft-side high thermal conductivity portion having a thermal conductivity higher than that of the oscillating gears 11 and 12.

The output shaft 9 is not limited to the aluminum alloy, and may be made of stainless steel instead. The thermal conductivity of the stainless steel is about 16.7 [W/m·K]. Alternatively, the output shaft 9 may be made of a ferrous metal, for example. As the ferrous metal, carbon steel, bearing steel, etc. may be used depending on desired properties. For example, the thermal conductivity of S45C as iron is about 45 [W/m·K].

A first end portion 9a of the output shaft 9 on the first carrier 13 side protrudes slightly from a surface 13c of the first carrier 13 facing away from the second carrier 14. A second end portion 9b of the output shaft 9 on the second carrier 14 side is situated slightly lower than the surface 14c of the second carrier 14. That is, the second end portion 9b of the output shaft 9 is received in the concave portion 16 of the second carrier 14. The concave portion 16 is formed around the output shaft 9 in the second carrier 14.

A retaining ring 18 is attached to each end portion 9a and 9b of the output shaft 9. Axial movement of the output shaft 9 relative to the carriers 13 and 14 is prevented by the retaining rings 18. In other words, the retaining rings 18 prevent the carriers 13 and 14 from slipping off from the output shaft 9 in the axial direction. Thus, the carriers 13 and 14 are kept being fitted to the corresponding radially enlarged portions 3a and 3b of the case 2, respectively. In this way, the carriers 13 and 14 and the output shafts 9 are integrated. Each output shaft 9 is inserted in the output shaft holes 13b and 14b of the carriers 13 and 14, thus the output shafts 9 are arranged around the input crankshaft 8.

The input crankshaft 8, like the output shafts 9, is made of, for example, an aluminum alloy. Thus, the input crankshaft 8 itself is formed of a shaft-side high thermal conductivity portion having a thermal conductivity higher than that of the oscillating gears 11 and 12. Alternatively, similar to the output shaft 9, the input crankshaft 8 may be made of, for example, stainless steel or various ferrous metals.

A first end portion 8a of the input crankshaft 8 on the first carrier 13 side protrudes axially outward through the first bearing 15a provided in the first carrier 13. A second servomotor 108 is connected to the first end portion 8a. The rotation of the second servomotor 108 is transmitted to the input crankshaft 8.

A second end 8b of the input crankshaft 8 on the second carrier 14 side is situated substantially flush with the end surface of the second bearing 15b provided in the second carrier 14 that faces away from the first carrier 13. The input crankshaft 8 has a first eccentric portion 21a and a second eccentric portion 21b arranged axially between the bearings 15a and 15b provided in the carriers 13 and 14, respectively. The input crankshaft 8 is formed with a radially enlarged portion 20 that has a larger diameter than the eccentric portions 21a and 21b and is disposed between the eccentric portions 21a and 21b.

The first eccentric portion 21a is situated on the first carrier 13 side. The second eccentric portion 21b is situated on the second carrier 14 side. Each eccentric portion 21a, 21b is provided eccentrically with reference to the second rotation axis L2. The eccentric portions 21a and 21b are out of phase with each other. For example, the eccentric portions 21a and 21b are out of phase with each other by 180°.

The bearings 15c and 15d (third bearing 15c and fourth bearing 15d) are provided on the eccentric portions 21a and 21b, respectively. Ball bearings, for example, are used for these bearings 15c and 15d as well as the first bearing 15a and the second bearing 15b. The axial distance between the bearings 15c and 15d is limited by abutment of the axial end surfaces of the bearings 15c and 15d against the radially enlarged portion 20. The oscillating gears 11 and 12 (first oscillating gear 11 and second oscillating gear 12) are rotatably supported by the eccentric portions 21a and 21b via the bearings 15c and 15d, respectively.

The two oscillating gears 11 and 12 are made of, for example, resin. For example, the oscillating gears 11 and 12 may be made of POM (polyacetal). Similarly to the material for the carriers 13 and 14 described above, various resins can be used for the oscillating gears 11 and 12. Since the oscillating gears 11 and 12 are made of resin, the thermal conductivity of the output shaft 9 and the thermal conductivity of the input crankshaft 8 are higher than the thermal conductivity of the oscillating gears 11 and 12. The thermal conductivity of the case 2 is higher than the thermal conductivity of the oscillating gears 11 and 12. The thermal conductivity of the internal tooth pins 6 is higher than that of the oscillating gears 11 and 12.

The two oscillating gears 11 and 12 are arranged at a prescribed distance from each other between the two carriers 13 and 14. At the radial center of the two oscillating gears 11 and 12, formed are crankshaft insertion holes 24a and 24b (first crankshaft insertion hole 24a and second crankshaft insertion hole 24b) that penetrate the oscillating gears 11 and 12 in the thickness direction and receive outer peripheral surfaces of the bearings 15c and 15d, respectively. In this way, the oscillating gears 11 and 12 are rotatably supported by the eccentric portions 21a and 21b via the bearings 15c and 15d. The eccentric portions 21a and 21b cause the oscillating gears 11 and 12 to oscillatory rotate.

External teeth 23a and 23b that mesh with the internal tooth pins 6 provided on the case 2 are formed on the outer peripheral portions of the carriers 13 and 14, respectively. The number of the external teeth 23a, 23b is smaller than the number of the internal tooth pins 6 by, for example, one. The two oscillating gears 11 and 12 have output shaft insertion holes 25a and 25b (first output shaft insertion hole 25a and second output shaft insertion hole 25b), respectively, at positions corresponding to the output shaft 9. The inner diameters of the output shaft insertion holes 25a and 25b are large enough to allow the oscillatory rotation of the oscillating gears 11 and 12 with the output shaft 9 inserted in the output shaft insertion holes 25a and 25b.

Of the two carriers 13 and 14 of the second speed reducing mechanism 1B configured in this way, the first arm 111, for example, is disposed on the surface 14c of the second carrier 14 that faces away from the first carrier 13. The first arm 111 is fixed to the first carrier 13 with bolts (not shown). The first arm 111 is formed with a convex portion 111a that fits into the input shaft hole 14a of the second carrier 14. By fitting the convex portion, the first arm 111 is positioned with respect to the second carrier 14 in the radial direction. The convex portion 111a protrudes to such an extent that it faces the second bearing 15b and the second end portion 8b of the input crankshaft 8 with a minute gap therebetween.

<Operation and Action of Second Speed Reducing Mechanism>

Next, the operation and action of the second speed reducing mechanism 1B will be described. By driving the second servomotor 108, the input crankshaft 8 is rotated. With the rotation of the crankshaft, the oscillating gears 11 and 12 rotatably supported by the eccentric portions 21a and 21b are oscillatory rotated. A part of the external teeth 23a and 23b of the oscillating gears 11 and 12 then mesh with the internal tooth pins 6 of the case 2.

At this time, the meshing positions of the external teeth 23a and 23b with the internal tooth pins 6 (case 2) are sequentially displaced in the circumferential direction since the number of teeth of each of the external teeth 23a and 23b is less than the number of the internal tooth pins 6 by, for example, one. Thus, the oscillating gears 11 and 12 rotate. This rotation is decelerated relative to the rotation of the input crankshaft 8.

The output shaft 9 is inserted in the output shaft insertion holes 25a and 25b of the oscillating gears 11 and 12. When the oscillating gears 11 and 12 rotate, the rotational force of the oscillating gears 11 and 12 in the rotational direction is transmitted to the output shafts 9. Each output shaft 9 is rotatably supported by the carriers 13 and 14. Thus, the rotational force of the oscillating gears 11 and 12 is transmitted to the carriers 13 and 14.

The outer peripheral surfaces of the carriers 13 and 14 are slidably fitted to the corresponding radially enlarged portions 3a and 3b of the case 2. Thus, each carrier 13 and 14 is rotated relative to the case 2. That is, the rotation of the second servomotor 108 is decelerated and outputted to the carrier 7 (the first carrier 13 and second carrier 14). The rotating head 102 is fixed to the case 2. The first arm 111 is fixed to the second carrier 14 among the carriers 13 and 14. Thus, the first arm 111 is rotated around the second rotation axis L2 relative to the rotating head 102.

For example, when the rotation of the first arm 111 (the second carrier 14) is restricted, the rotation of the second servomotor 108 is decelerated and outputted to the case 2. In this case, the rotating head 102 is rotated around the second rotation axis L2 relative to the first arm 111. That is, the speed reducing mechanisms 1A to 1C restrict the rotation of either the case 2 or the carrier 7, so that the other of the case 2 and the carrier 7 serves as the output for the servomotors 107 to 109. This operation principle also applies to the first speed reducing mechanism 1A and the third speed reducing mechanism 1C.

Each elements generate heat due to the meshing between the internal tooth pins 6 and the oscillating gears 11 and 12, the sliding friction between the case 2 and the carriers 13 and 14, the sliding friction between the carriers 13 and 14 and the output shaft 9, and the sliding friction the bearings 15a to 15d, and the like. The input crankshaft 8 and the output shafts 9 are made of stainless steel, for example. The thermal conductivity of the input crankshaft 8 and the output shafts 9 is higher than that of the oscillating gears 11 and 12.

Therefore, the heat trapped inside the second speed reducing mechanism 1B is actively transferred to the input crankshaft 8 and the output shafts 9. For example, the heat of the bearings 15a to 15d and the heat of the oscillating gears 11 and 12 are actively transferred to the input crankshaft 8. Heat is accumulated in the oscillating gears 11 and 12 by the heat of the internal tooth pins 6, the third bearing 15c, and the fourth bearing 15d transferred to the oscillating gears 11 and 12 and the heat of the oscillating gears 11 and 12 themselves, but this heat is actively is transferred to the output shaft 9.

The heat transferred to the input crankshaft 8 spreads over the entire crankshaft in the axial direction and is transferred to the first end portion 8a and the second end portion 8b (see the arrows in FIG. 2). Heat is dissipated through the end portions 8a and 8b. Since the second end portion 8b faces the convex portion 111a of the first arm 111 with the minute gap therebetween, the heat of the second end portion 8b is also transferred to the first arm 111. Since the first arm 111 is made of, for example, an aluminum alloy, its thermal conductivity is higher than that of the input crankshaft 8 and the output shaft 9. In this way, the heat transferred from the input crankshaft 8 to the first arm 111 is effectively released.

At the same time, the heat transferred to the output shaft 9 spreads over the entire shaft in the axial direction and is transferred to the first end portion 9a and the second end portion 9b (see the arrows in FIG. 2). Heat is dissipated through the end portions 9a and 9b. The concave portion 16 is formed in the second carrier 14 around the second end portion 9b of the output shaft 9. The concave portion 16 is filled with the grease 17. The first arm 111 is arranged such that it blocks the opening of the concave portion 16 filled with the grease 17, that is, it overlaps the surface 14c of the second carrier 14. Thus, the heat of the second end portion 9b of the output shaft 9 is efficiently transferred to the first arm 111 through the grease 17. Therefore, the heat transferred from the output shaft 9 to the first arm 111 is effectively released.

The case 2 is made of, for example, an aluminum alloy. The internal tooth pins 6 can be made of a metal material, a high-thermal-conductivity resin, a non-metallic material, or the like. The oscillating gears 11 and 12 are made of, for example, resin. The thermal conductivity of the case 2 is higher than that of the oscillating gears 11 and 12, and the thermal conductivity of the internal tooth pins 6 is higher than that of the oscillating gears 11 and 12. Thus, the heat generated by the meshing between the internal tooth pins 6 and the oscillating gears 11 and 12 can be actively transferred to the case 2 and the internal tooth pins 6. Therefore, it is possible to prevent the heat accumulation inside the second speed reducing mechanism 1B.

The heat dissipation effect as described above is the same for the first speed reducing mechanism 1A and the third speed reducing mechanism 1C. The heat accumulated inside the first speed reducing mechanism 1A and the third speed reducing mechanism 1C is released through the input crankshaft 8 and the output shafts 9. The heat is transferred to the rotating head 102, the second arm 112 and the like via the input crankshaft 8 and the output shafts 9, and the heat is effectively released. The case 2 and the internal tooth pins 6 prevent heat from being trapped inside the speed reducing mechanisms 1A and 1C.

As described above, the speed reducing mechanisms 1A, 1B, and 1C each include the case 2 (the internal tooth pins 6), the oscillating gears 11 and 12 meshing with the internal tooth pins 6, the input crankshaft 8 transmitting the rotational force of the oscillating gears 11 and 12, and the output shafts 9 to which the rotational force of the oscillating gears 11 and 12 is transmitted. Each of the shafts 8 and 9 is made of, for example, an aluminum alloy having a higher thermal conductivity than the oscillating gears 11 and 12. Thus, heat generated in the internal tooth pins 6, the oscillating gears 11 and 12, the carriers 13 and 14, and the bearings 15a to 15d can be actively transferred to the input crankshaft 8 and the output shafts 9. The heat transferred to the shafts 8 and 9 spreads over the entire axial length of the shafts, and can be actively released from the end portions 8a to 9b of the shafts 8 and 9. Therefore, it is possible to efficiently suppress the temperature rise inside the speed reducing mechanisms 1A, 1B, and 1C.

The concave portion 16 is formed in the second carrier 14 around the second end portion 9b of the output shaft 9. The concave portion 16 is filled with the grease 17. Thus, the heat of the second end portion 9b of the output shaft 9 is efficiently transferred to the rotating head 102 and the arms 111 and 112 through the grease 17. With such a simple structure, it is possible to efficiently release the heat of the second end portion 9b of the output shaft 9.

When the concave portion 16 is not filled with the grease 17, a portion where the concave portion 16 is formed form an air layer, producing a heat insulating effect. By filling the concave portion 16 with the grease 17, the heat transfer efficiency in the concave portion 16 can be greatly improved. Since the thermal conductivity of the grease 17 is 5 [W/m·K] or greater, heat is efficiently transferred from the second end portion 9b of the output shaft 9 to the second carrier 14, the rotating head 102, and the arms 111 and 112 to release the heat therefrom.

The base portion 101, the rotating head 102, the first arm 111, and the second arm 112 of the cooperative robot 100 are made of, for example, an aluminum alloy. That is, the thermal conductivities of the base portion 101, the rotating head 102, the first arm 111, and the second arm 112 are higher than those of the shafts 8 and 9 made of stainless steel, for example. Thus, the heat transferred to the shafts 8 and 9 can be efficiently transferred to the rotating head 102, the first arm 111, and the second arm 112. Therefore, it is possible to further improve the heat radiation property of the heat transmitted to the respective shafts 8 and 9, and to more efficiently suppress the temperature rise inside the speed reducing mechanisms 1A, 1B and 1C.

As described above, the eccentric oscillating-type speed reducing mechanism (speed reducing mechanism 1A, 1B, 1C) utilizes the input crankshaft 8 and the output shafts 9 to efficiently release the heat generated in the internal tooth pins 6, the oscillating gears 11 and 12, the carriers 13 and 14, and the bearings 15a to 15d. The case 2 is made of, for example, an aluminum alloy. By making the thermal conductivity of the case 2 higher than that of the internal tooth pins 6 and the oscillating gears 11 and 12, the heat inside the speed reducing mechanisms 1A, 1B and 1C is actively released by utilizing the case 2. The case 2 can increase the heat releasing area of the speed reducing mechanisms 1A, 1B, and 1C as much as possible. Therefore, it is possible to more efficiently suppress the temperature rise inside the speed reducing mechanisms 1A, 1B, and 1C.

In addition to the case 2 made of an aluminum alloy, the internal tooth pins 6 can be made of a metal material, a high-thermal-conductivity resin, a non-metallic material, or the like. The oscillating gears 11 and 12 are made of, for example, resin. The thermal conductivity of the case 2 is higher than that of the oscillating gears 11 and 12, and the thermal conductivity of the internal tooth pins 6 is higher than that of the oscillating gears 11 and 12. Thus, the heat generated by the meshing between the internal tooth pins 6 and the oscillating gears 11 and 12 can be actively transferred to the case 2 and the internal tooth pins 6. Therefore, it is possible to prevent the heat accumulation inside the second speed reducing mechanism 1B.

Since the oscillating gears 11 and 12 are made of resin, the oscillating gears 11 and 12 can be easily molded, and the manufacturing cost of the speed reducing mechanisms 1A, 1B, and 1C can be reduced. Moreover, the heat transfer to the oscillating gears 11 and 12 can be suppressed, and as a result, unevenness in the heat transfer to the case 2 and the shafts 8 and 9 can be reduced. Therefore, the heat inside the speed reducing mechanisms 1A, 1B, and 1C can be actively released to the outside, and the temperature rise inside the speed reducing mechanisms 1A, 1B, and 1C can be suppressed more efficiently.

In the cooperative robot 100, by adopting such speed reducing mechanisms 1A, 1B, and 1C, the temperature rise of the speed reducing mechanisms 1A, 1B, and 1C can be efficiently suppressed and consequently the product life of the speed reducing mechanisms 1A, 1B, and 1C can be extended. Therefore, the maintenance cost of the cooperative robot 100 can also be reduced.

In the above-described first embodiment, the input crankshaft 8 and the output shafts 9 themselves are made of an aluminum alloy or the like, which is the shaft-side high thermal conductivity portion having a thermal conductivity higher than that of the oscillating gears 11 and 12. However, the input crankshaft 8 and the output shaft 9 are not limited to this. The input crankshaft 8 and the output shafts 9 may be configured in any other way provided that they at least partially have the shaft-side high thermal-conductivity portion (for example, an aluminum alloy) that covers the entire axial length of shaft. For example, an aluminum alloy may be insert-molded into a part of the resin shaft. By arranging the aluminum alloy over the entire axial length of the shaft, the heat spreads to each end portions 8a to 9b of the shafts 8 and 9 in the axial direction and can be released through the end portions 9a and 9b.

The input crankshaft 8 and the output shafts 9 are not necessarily configured in the same manner. At least one of the input crankshaft 8 or the output shaft 9 may at least partially have the shaft-side high thermal conductivity portion (for example, an aluminum alloy) over the entire axial length of the shaft.

Second Embodiment

<Speed Reducing Mechanism>

Figure 3:
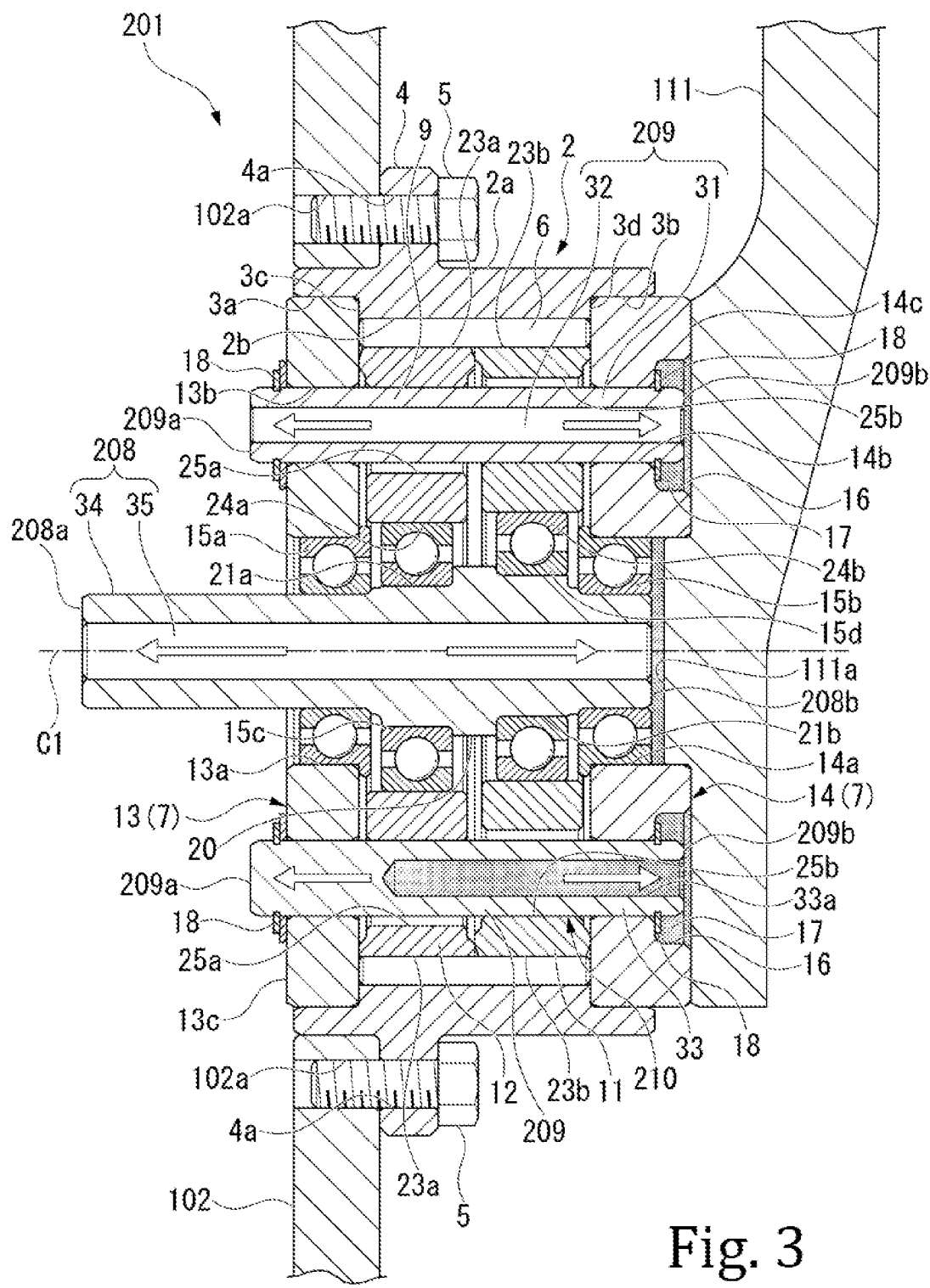
FIG. 3 schematically illustrates a configuration of a speed reducing mechanism in a second embodiment of the disclosure.

The following describes a second embodiment of the present disclosure with reference to FIG. 3 and by referring to FIG. 1. FIG. 3 schematically illustrates the configuration of a speed reducing mechanism 201 in the second embodiment. Elements and components similar to those of the first embodiment are referred to using the same referral numerals. In the following description of the second embodiment, the same labels as the first embodiment are used description thereof will be omitted.

As shown in FIG. 1, the second embodiment is similar to the above-described first embodiment in that the speed reducing mechanism 201 is used in the cooperative robot 100. As shown in FIG. 2, the speed reducing mechanism 201 of the second embodiment is a so-called eccentric oscillating-type speed reducing mechanism. Similar to the speed reducing mechanisms 1A, 1B, and 1C of the above-described first embodiment, it includes the case 2, the carrier 7, an input crankshaft 208 (an example of the shaft-side high thermal conductivity portion in the claims), an output shaft 209 (an example of the shaft-side high thermal conductivity portion in the claims), and the oscillating gears 11 and 12.

The difference between the first embodiment and the second embodiment is that the shafts 208 and 209 of the second embodiment are different from the shafts 8 and 9 of the first embodiment. The output shaft 209 includes an output tubular portion 31 extending in the axial direction and an output heat pipe 32 provided inside the output tubular portion 31.

The axial length of the output tubular portion 31 is the same as the axial length of the output shaft 9 of the first embodiment described above. The output tubular portion 31 has a cylindrical shape in the entire axial direction. The output tubular portion 31 is made of an aluminum alloy, for example, like the output shaft 9 of the first embodiment described above. Alternatively, similar to the output shaft 9, the output tubular portion 31 may be made of, for example, stainless steel or various ferrous metals. The retaining ring 18 is attached to each end portion 209a and 209b of the output tubular portion 31 in the axial direction.

The output heat pipe 32 is provided such it fills the inside of the output tubular portion 31 and contacts the inner peripheral surface of the output tubular portion 31. The thermal conductivity of the output heat pipe 32 is approximately 30,000 [W/m·K]. Since the output tubular portion 31 is made of aluminum alloy, stainless steel, or ferrous metal, the rigidity of the output tubular portion 31 is higher than that of the output heat pipe 32.

The input crankshaft 208 includes an input tubular portion 34 extending in the axial direction and an input heat pipe 35 provided inside the input tubular portion 34. The axial length of the input tubular portion 34 is the same as the axial length of the input crankshaft 8 of the first embodiment described above. The input tubular portion 34 has a cylindrical shape in the entire axial direction. The input tubular portion 34 is made of an aluminum alloy, for example, like the input crankshaft 8 of the first embodiment described above. Alternatively, similar to the input crankshaft 8, the input tubular portion 34 may be made of, for example, stainless steel or various ferrous metals.

The input tubular portion 34 has the first eccentric portion 21a and second eccentric portion 21b arranged axially between the bearings 15a and 15b provided in the carriers 13 and 14, respectively. The input tubular portion 34 is formed with the radially enlarged portion 20 that has a larger diameter than the eccentric portions 21a and 21b and is disposed between the eccentric portions 21a and 21b. The input heat pipe 35 is provided such it fills the inside of the input tubular portion 34 and contacts the inner peripheral surface of the input tubular portion 34. The configuration of the input heat pipe 35 is the same as the configuration of the output heat pipe 32. Thus, the rigidity of the input tubular portion 34 is higher than that of the input heat pipe 35.

Therefore, according to the above-described second embodiment, the same effect as that of the first embodiment is obtained. The shafts 208 and 209 includes the tubular portions 31 and 34 (output tubular portion 31, input tubular portion 34) and the heat pipes 32 and 35 (output heat pipe 32, input heat pipe) provided inside the tubular portions 31 and 34, respectively. Thus, the rigidity of the tubular portions 31 and 34 is higher than that of the heat pipes 32 and 35. Therefore, it is possible to secure the rigidity of each shaft 208 and 209 while increasing the thermal conductivity of the shafts 208 and 209 as a whole by using a material with a high thermal conductivity such as the heat pipes 32 and 35. As a result, a highly reliable speed reducing mechanism 201 can be provided. By using the heat pipes 32 and 35, it is possible to effectively increase the thermal conductivity of the shafts 208 and 209 as a whole with a simple structure.

The thermal conductivity of the heat pipes 32 and 35 is higher than that of the tubular portions 31 and 34, and is 100 [W/m·K] or greater. Thus, it is possible to reliably and efficiently distribute the heat to the end portions 208a to 209b in the axial direction (see the arrows in FIG. 3). The heat transferred from these end portions 208a to 209b to the shafts 208 and 209 can be actively released. Therefore, it is possible to efficiently suppress the temperature rise inside the speed reducing mechanism 201.

In the above-described second embodiment, the heat pipes 32 and 35 provided inside the tubular portions 31 and 34 are used as the shaft-side high thermal conductivity portions having a thermal conductivity higher than that of the oscillating gears 11 and 12. However, the thermal conductivity of the shaft-side high thermal conductivity portion is not limited to this. It may be any value as long as the thermal conductivity of the shaft-side high thermal conductivity portion is higher than the thermal conductivity of the oscillating gears 11 and 12. Preferably, the thermal conductivity of the shaft-side high thermal conductivity portion is higher than the thermal conductivity of the tubular portions 31 and 34 and is 100 [W/m·K] or greater.

For example, the heat pipes 32, 35 may be replaced with copper, silver, or thermal grease. The thermal conductivity of copper is about 403 [W/m·K]. The thermal conductivity of silver is about 428 [W/m·K]. By configuring in this way, the heat transferred to the shafts 208 and 209 can be reliably and efficiently distributed to the axial end portions 208a to 209b of the shafts 208 and 209. The heat actively transferred to the shafts 208 and 209 from the end portions 208a to 209b can be released. Therefore, it is possible to efficiently suppress the temperature rise inside the speed reducing mechanism 201.

In the second embodiment described above, the case where the tubular portions 31 and 32 included in the shafts 208 and 209 respectively have a cylindrical shape in the entire axial length of the shaft has been described. That is, the case where each of the tubular portions 31 and 32 is formed with a hole (hollow) extending therethrough in the axial direction has been described. However, the embodiment is not limited to this. For example, the hole (hollow) does not necessarily extend through the entire axial length of the tubular portions 31 and 32.

A specific example of this is illustrated in FIG. 3 below the central axis C1. That is, the output tubular portion 31 of the output shaft 210 shown below the center axis C1 in FIG. 3 may have the shape in which a concave portion 33a is formed in the axial center of a solid shaft 33 at a position between the second end portion 209b and the front of the first end portion 209a. The concave portion 33a may be filled with thermal grease or the like. The input crankshaft 208 may also have the similar configuration. When adopting such a configuration, the thermal conductivity of the tubular portions 31 and 32 is made higher than the thermal conductivity of the oscillating gears 11 and 12. By configuring in this way, the same effects as those of the above-described first embodiment can be obtained. Moreover, heat can be efficiently transferred to the axial end portions 208a to 209b of the shafts 208, 209, and 210.

The speed reducing mechanism 201 may use the output shafts 209 and 210 in combination. In the second embodiment described above, the case where the input crankshaft 208 and the output shaft 209 are configured by the tubular portions 31 and 34 and the heat pipes 32 and 35 has been described. However, the invention is not limited to this. At least one of the input crankshaft 208 or the output shaft 209 may include the tubular portion 31 or 34 and the heat pipe 32 or 35.

The present disclosure is not limited to the above embodiments but encompasses various modifications of the above embodiments not departing from the purport of the present disclosure. For example, the above-described embodiment described the case where the reducing mechanisms 1A to 1C and 201 are used in the cooperative robot 100 as a robot. However, the embodiments are not intended to this. The configurations of the above-described embodiments can be adopted for various robots having different configurations provided that the robot includes two members (first member and second member), and a speed reducing mechanisms 1A to 1C and 201 disposed between the two members, and the second member rotates relative to the first member.

In the above embodiments, the speed reducing mechanisms 1A to 1C and 201 have been described as an example of the gear mechanism. However, the gear mechanism is not limited to these. In place of the speed reducing mechanisms 1A to 1C, the configuration of the above-described embodiments can be adopted for various gear mechanisms that have two gears meshed with each other and the rotational force is transmitted to one of the two gears, or have the shaft to which the rotational force of the one gear is transmitted.

In the above-described embodiments, the speed reducing mechanisms 1A to 1C and 201 are so-called eccentric oscillating-type speed reducing mechanisms, and each speed reducing mechanism has the single center crankshaft (input crankshaft 8 or 208) coaxial with the central axis C1 of the case 2. However, the embodiments are not limited to this. The eccentric oscillating-type speed reducing mechanism may be configured to oscillatory rotate the oscillating gears 11 and 12 by rotating two or more input crankshafts 8 or 208 in conjunction with each other. In this case, the input crankshafts 8 or 208 rotate while they revolve around the center axis C1 at the same time.

The cooperative robot 100 described above uses the servomotors 107, 108, and 109 as drive sources. However, the drive source is not limited to this, and various drive sources such as other electric motors, hydraulic motors, engines, or the like may be used in place of the servomotor.

In the above-described embodiment, the concave portion 16 formed in the second carrier 14 is filled with the grease 17 as the support member-side high thermal conductivity portion that has a thermal conductivity higher than that of the oscillating gears 11 and 12 and the second carrier 14. However, the embodiments are not limited to this and it is not always necessary to accommodate a member that serves as the support member-side high thermal conductivity portion in the concave portion 16. When the second carrier 14 is provided with the support member-side high thermal conductivity portion, the concave portion 16 and the grease 17 are not necessarily provided. Alternatively, a member that serves as the support member-side high thermal conductivity portion having a thermal conductivity higher than the oscillating gears 11 and 12 and the second carrier 14 may be provided at a portion corresponding to the periphery of the output shaft 9 of the second carrier 14. It is preferable that the thermal conductivity of the support member-side high thermal conductivity portion is 5 [W/m·K] or greater.

In the first embodiment described above, each of the speed reducing mechanism 1A to 1C is provided with the input crankshaft 8 and the output shaft 9. In the second embodiment described above, the speed reducing mechanism 201 is provided with the input crankshaft 208 and the output shaft 209. However, the configuration of the speed reducing mechanism is not limited to these. The shafts 8 and 9 of the first embodiment and the shafts 208, 209, and 210 of the second embodiment may be used in combination.

In the embodiments disclosed herein, a member formed of multiple components may be integrated into a single component, or conversely, a member formed of a single component may be divided into multiple components. Irrespective of whether or not the constituent parts are integrated, they are acceptable as long as they are configured to solve the problems.

The disclosure encompasses the following additional embodiments.

Additional Embodiment 1

A gear mechanism, including:
an internal gear having internal teeth;
an oscillating gear being oscillatory rotated;
an input crankshaft transmitting a rotational force to the oscillating gear;
an output shaft to which a rotational force of the oscillating gear is transmitted; and
a support member supporting each axial end portion of the output shaft rotatably,
wherein the oscillating gear has external teeth that mesh with the internal teeth of the internal gear,
wherein the input crankshaft has an eccentric portion that rotatably support the oscillating gear,
wherein the output shaft is provided around the input crankshaft and inserted in the oscillating gear,
wherein at least one of the input crankshaft or the output shaft includes:
a tubular portion extending over an entire axial length of shaft; and
a shaft-side high thermal conductivity portion provided inside the tubular portion,
wherein the shaft-side high thermal conductivity portion contacts an inner peripheral surface of the tubular portion,
wherein a thermal conductivity of the shaft-side high thermal conductivity portion is higher than a thermal conductivity of the oscillating gear,
wherein a rigidity of the tubular portion is higher than a rigidity of the shaft-side high thermal conductivity portion,
wherein the support member has a concave portion formed around the output shaft, and
wherein the concave portion receives a support member-side high thermal conductivity portion that has a thermal conductivity higher than the thermal conductivity of the oscillating gear.

What is claimed is:

1. A gear mechanism, comprising:
a first gear;
a second gear meshing with the first gear;
a shaft inserted in the second gear; and
a support member rotatably supporting each axial end portion of the shaft,
wherein the shaft transmits a rotational force to the second gear or a rotational force of the second gear is transmitted to the shaft,
wherein the shaft at least partially has a shaft-side high thermal conductivity portion, the shaft-side high thermal conductivity portion extending over an entire axial length of the shaft,
wherein a thermal conductivity of the shaft-side high thermal conductivity portion is higher than a thermal conductivity of the second gear,
wherein the support member has a support member-side high thermal conductivity portion provided around the shaft, and
wherein a thermal conductivity of the support member-side high thermal conductivity portion is higher than the thermal conductivity of the second gear and a thermal conductivity of the support member.

2. The gear mechanism of claim 1, wherein the shaft has a tubular portion extending over the entire axial length of the shaft,
wherein the shaft-side high thermal conductivity portion is provided inside the tubular portion and contacts an inner peripheral surface of the tubular portion, and
wherein a rigidity of the tubular portion is higher than a rigidity of the shaft-side high thermal conductivity portion.

3. The gear mechanism of claim 2, wherein a thermal conductivity of the shaft-side high thermal conductivity portion is higher than a thermal conductivity of the tubular portion and is 100 W/m·K or greater.

4. The gear mechanism of claim 2, wherein the shaft-side high thermal conductivity portion includes a heat pipe.

5. The gear mechanism of claim 1, wherein the support member has a concave portion formed around the shaft, and
   wherein the support member-side high thermal conductivity portion is received in the concave portion.

6. The gear mechanism of claim 1, wherein the support member-side high thermal conductivity portion includes grease.

7. The gear mechanism of claim 1, wherein a thermal conductivity of the support member-side high thermal conductivity portion is 5 W/m·K or greater.

8. The gear mechanism of claim 1, further comprising a mating member to which the support member is attached,
   wherein a thermal conductivity of the mating member is equal to or higher than the thermal conductivity of the shaft-side high thermal conductivity portion.

9. A gear mechanism, comprising:
   a first gear;
   a second gear meshing with the first gear; and
   a shaft inserted in the second gear,
   wherein the shaft transmits a rotational force to the second gear or a rotational force of the second gear is transmitted to the shaft,
   wherein the shaft at least partially has a shaft-side high thermal conductivity portion, the shaft-side high thermal conductivity portion extending over an entire axial length of the shaft,
   wherein a thermal conductivity of the shaft-side high thermal conductivity portion is higher than a thermal conductivity of the second gear,
   wherein the first gear includes an internal gear that has internal teeth,
   wherein the second gear includes an oscillating gear that has external teeth meshing with the internal teeth and is oscillatory rotated,
   wherein the shaft includes at least one of an input crankshaft or an output shaft, the input crankshaft transmitting a rotational force to the oscillating gear, a rotational force of the oscillating gear being transmitted to the output shaft,
   wherein the input crankshaft has an eccentric portion that rotatably supports the oscillating gear,
   wherein the output shaft is provided around the input crankshaft and inserted in the oscillating gear,
   wherein the internal gear includes:
      a cylindrical case; and
      a plurality of internal tooth pins arranged on an inner peripheral surface of the case along a circumferential direction, and
      wherein a thermal conductivity of the case is higher than a thermal conductivity of the plurality of internal tooth pins and a thermal conductivity of the oscillating gear.

10. A gear mechanism, comprising:
    a first gear;
    a second gear meshing with the first gear; and
    a shaft inserted in the second gear,
    wherein the shaft transmits a rotational force to the second gear or a rotational force of the second gear is transmitted to the shaft,
    wherein the shaft at least partially has a shaft-side high thermal conductivity portion, the shaft-side high thermal conductivity portion extending over an entire axial length of the shaft,
    wherein a thermal conductivity of the shaft-side high thermal conductivity portion is higher than a thermal conductivity of the second gear,
    wherein the first gear includes an internal gear that has internal teeth,
    wherein the second gear includes an oscillating gear that has external teeth meshing with the internal teeth and is oscillatory rotated,
    wherein the shaft includes at least one of an input crankshaft or an output shaft, the input crankshaft transmitting a rotational force to the oscillating gear, a rotational force of the oscillating gear being transmitted to the output shaft,
    wherein the input crankshaft has an eccentric portion that rotatably supports the oscillating gear,
    wherein the output shaft is provided around the input crankshaft and inserted in the oscillating gear,
    wherein the internal gear includes:
       a cylindrical case; and
       a plurality of internal tooth pins arranged on an inner peripheral surface of the case along a circumferential direction,
       wherein a thermal conductivity of the case is higher than a thermal conductivity of the oscillating gear, and
       wherein a thermal conductivity of the plurality of internal tooth pins is higher than the thermal conductivity of the oscillating gear.

11. The gear mechanism of claim 9, wherein the oscillating gear is made of resin.

12. A robot, comprising:
    a first member and a second member; and
    a gear mechanism provided between the first member and the second member,
    wherein the gear mechanism rotates the second member relative to the first member,
    wherein the gear mechanism includes:
       an internal gear having internal teeth;
       an oscillating gear being oscillatory rotated;
       an input crankshaft transmitting a rotational force to the oscillating gear;
       an output shaft to which a rotational force of the oscillating gear is transmitted; and
       a support member fixed to the second member,
    wherein the internal gear is fixed to the first member,
    wherein the oscillating gear has external teeth that mesh with the internal teeth of the internal gear,
    wherein the input crankshaft has an eccentric portion that rotatably support the oscillating gear,
    wherein the output shaft is provided around the input crankshaft and inserted in the oscillating gear,
    wherein the support member rotatably supports each axial end portion of the output shaft,
    wherein one of the input crankshaft or the output shaft has a shaft-side high thermal conductivity portion, the shaft-side high thermal conductivity portion having a thermal conductivity higher than a thermal conductivity of the oscillating gear,
    wherein the shaft-side high thermal conductivity portion is provided at least partially in the one of the input crankshaft or the output shaft, and the shaft-side high thermal conductivity portion extends over an entire axial length of the one of the input crankshaft or the output shaft, wherein at least one of the input crankshaft or the output shaft includes:
- a tubular portion extending over an entire axial length of shaft; and
- a shaft-side high thermal conductivity portion provided inside the tubular portion, wherein the shaft-side high thermal conductivity portion contacts an inner peripheral surface of the tubular portion, wherein the support member has a concave portion formed around the output shaft, wherein a support member-side high thermal conductivity portion is received in the concave portion, and wherein a thermal conductivity of the support member-side high thermal conductivity portion is higher than the thermal conductivity of the oscillating gear.

13. A robot, comprising:
a first member and a second member; and
a gear mechanism provided between the first member and the second member,
wherein the gear mechanism rotates the second member relative to the first member,
wherein the gear mechanism includes:
- an internal gear having internal teeth;
- an oscillating gear being oscillatory rotated;
- an input crankshaft transmitting a rotational force to the oscillating gear;
- an output shaft to which a rotational force of the oscillating gear is transmitted; and
- a support member fixed to the second member, wherein the internal gear is fixed to the first member, wherein the oscillating gear has external teeth that mesh with the internal teeth of the internal gear, wherein the input crankshaft has an eccentric portion that rotatably support the oscillating gear, wherein the output shaft is provided around the input crankshaft and inserted in the oscillating gear, wherein the support member rotatably supports each axial end portion of the output shaft, wherein one of the input crankshaft or the output shaft has a shaft-side high thermal conductivity portion, the shaft-side high thermal conductivity portion having a thermal conductivity higher than a thermal conductivity of the oscillating gear, wherein the shaft-side high thermal conductivity portion is provided at least partially in the one of the input crankshaft or the output shaft, and the shaft-side high thermal conductivity portion extends over an entire axial length of the one of the input crankshaft or the output shaft, wherein at least one of the input crankshaft or the output shaft includes:
- a tubular portion extending over an entire axial length of shaft; and
- a shaft-side high thermal conductivity portion provided inside the tubular portion,
  - wherein the shaft-side high thermal conductivity portion contacts an inner peripheral surface of the tubular portion, and wherein a thermal conductivity of the second member is equal to or higher than a thermal conductivity of the output shaft.

14. The gear mechanism of claim 10, wherein the oscillating gear is made of resin.

* * * * *